Patented Dec. 5, 1922.

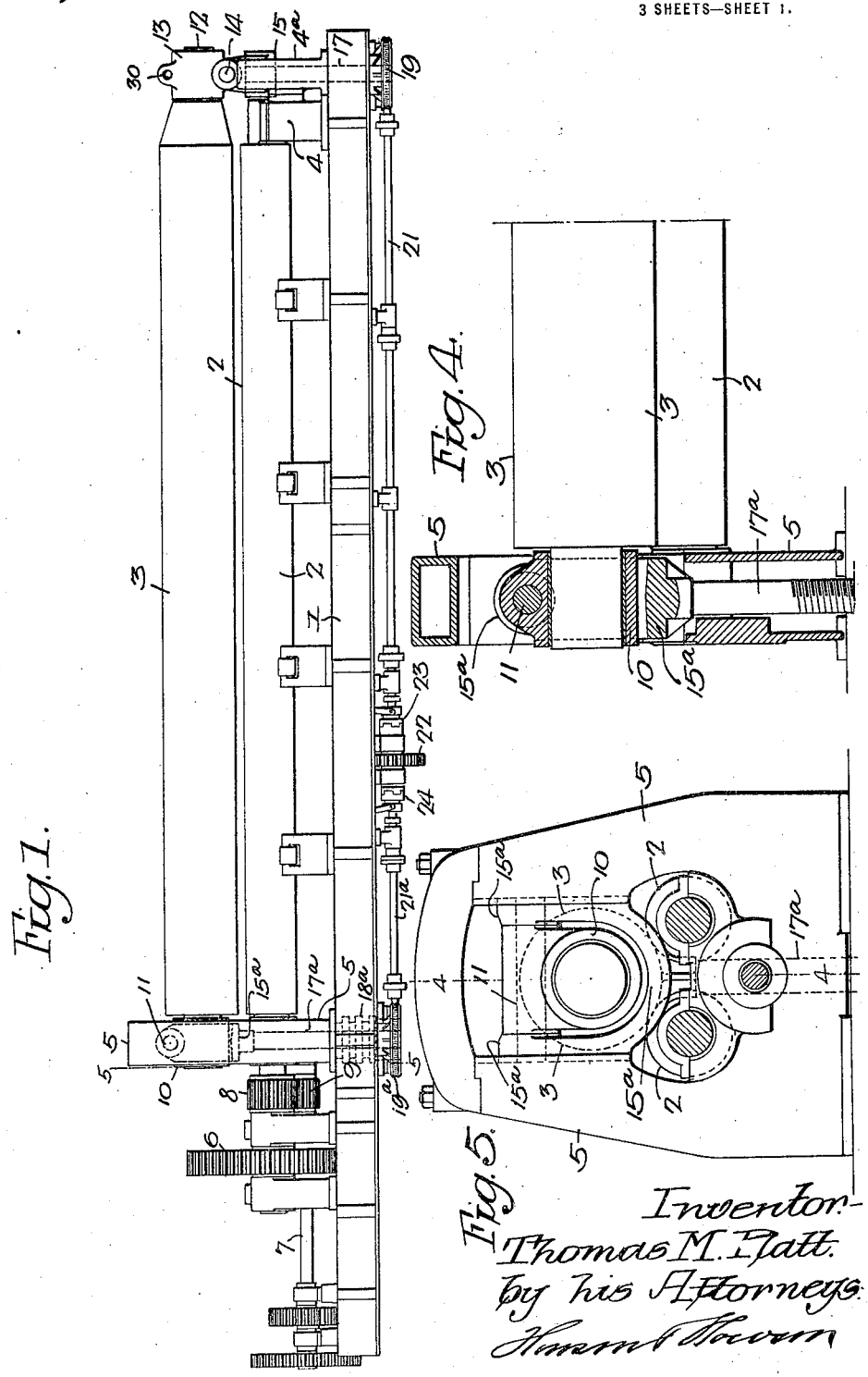

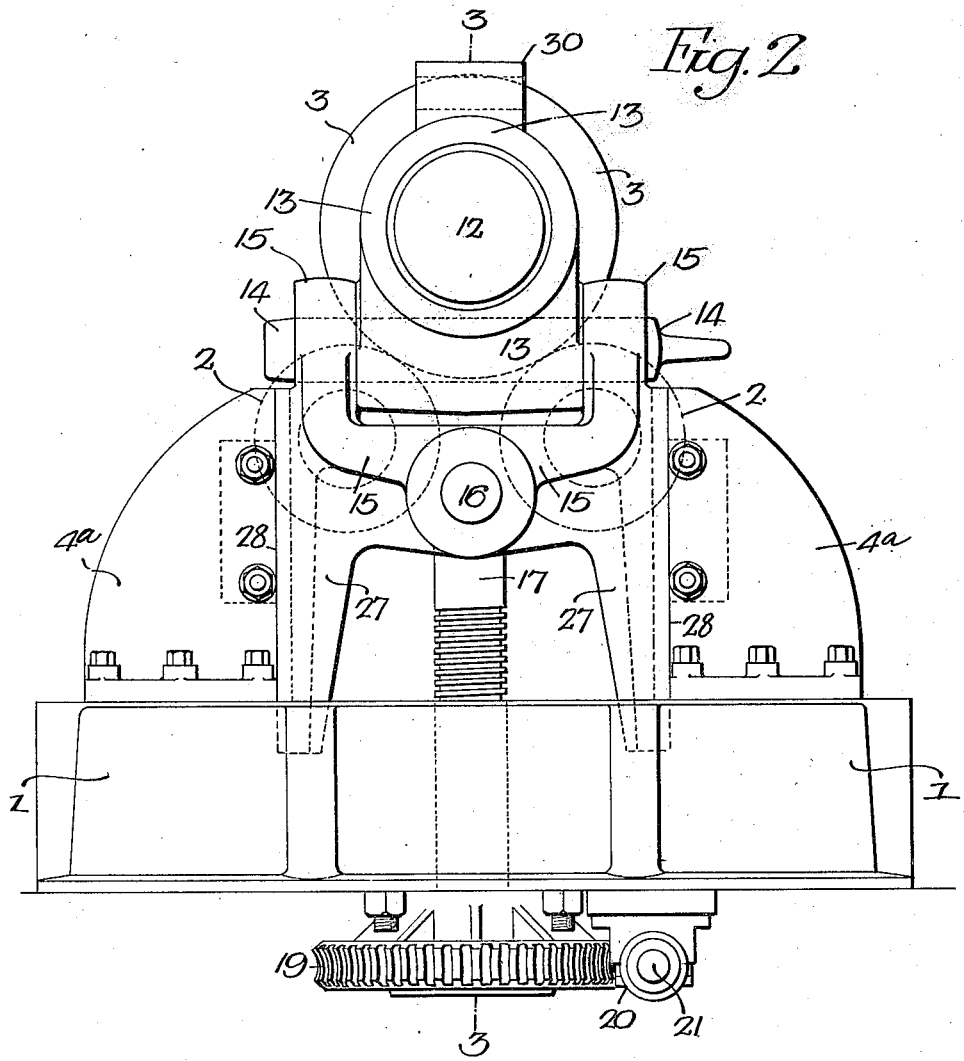

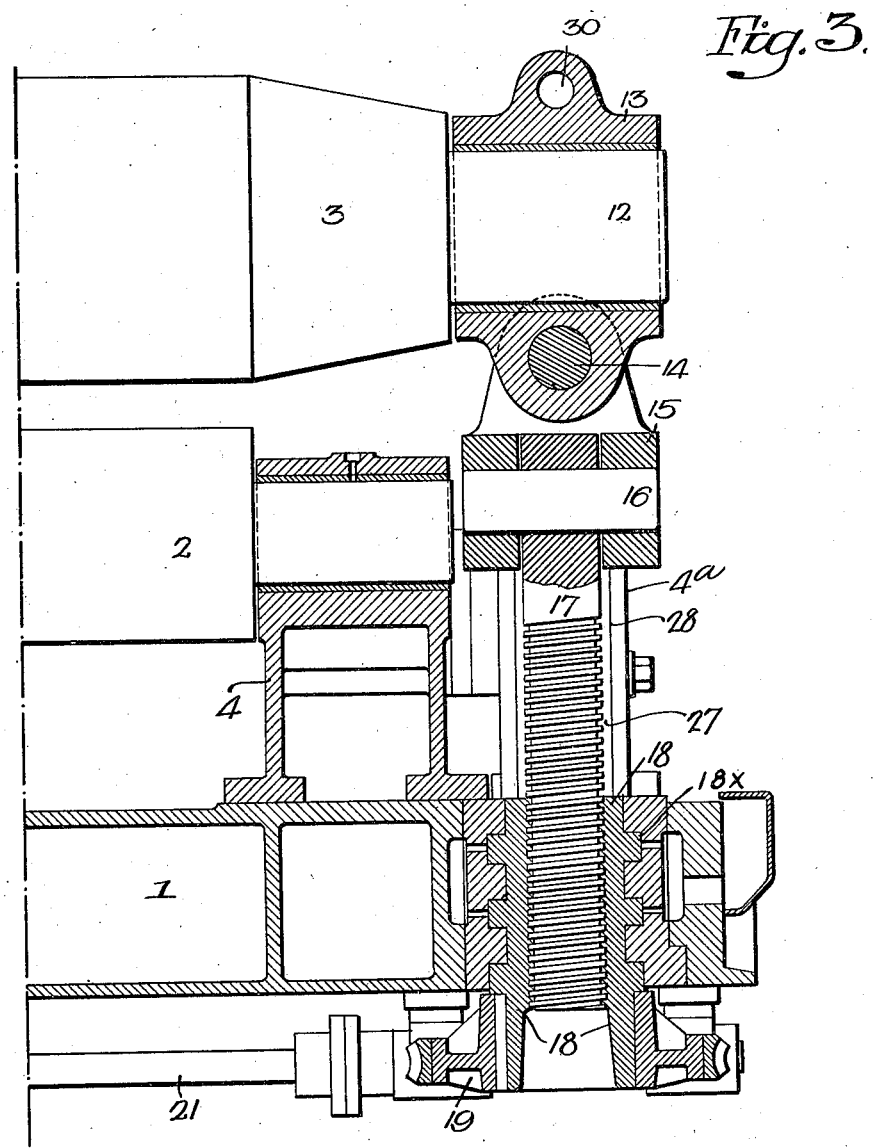

1,438,058

UNITED STATES PATENT OFFICE.

THOMAS M. PLATT, OF PHILADELPHIA, PENNSYLVANIA, ASSIGNOR TO SOUTHWARK FOUNDRY & MACHINE COMPANY, OF PHILADELPHIA, PENNSYLVANIA, A CORPORATION OF PENNSYLVANIA.

PLATE-BENDING ROLLS.

Application filed August 26, 1920. Serial No. 406,153.

*To all whom it may concern:*

Be it known that I, THOMAS M. PLATT, a citizen of the United States, residing in Philadelphia, Pennsylvania, have invented certain Improvements in Plate-Bending Rolls, of which the following is a specification.

One object of my invention is to make a bending roll with a movable housing so that the plates which are bent almost to a complete cylinder can be removed from one end of the machine.

A further object of the invention is to provide an improved bearing for the upper roll.

In the accompanying drawings:

Fig. 1 is a side view of a roll bending machine illustrating my invention;

Fig. 2 is an end view;

Fig. 3 is a sectional view of one end of the machine on the line 3—3, Fig. 2;

Fig. 4 is a sectional view of the bearing at the opposite end of the machine, on the line 4—4, Fig. 5; and Fig. 5 is a sectional view on the line 5—5, Fig. 1.

1 is the base of the machine. 2, 2 are the lower bending rolls and 3 is the upper bending roll, which is mounted above the space between the two rolls 2, as clearly shown in Fig. 2. The rolls 2 are mounted in housings 4 and 5 of the ordinary construction. The lower rolls are driven through gearing 6 from the driving shaft 7. The two rolls are run at the same speed and in the same direction. On the rolls are gear wheels 8 and on a stud is an intermediate gear wheel 9. The roll 3 has trunnions at each end, and one trunnion is mounted in a bearing 10 hung from a pivot pin 11 on a forked cross head $15^a$ adapted to slide vertically in the housing 5. The other trunnion 12 of the roll 3 is mounted in a bearing 13 which is connected to a cross head 15 by a removable pin 14. On the cross head are guides 27 which are adapted to ways 28 on the housing $4^a$.

Pivotally connected to the cross head 15 by a pin 16 is a screw 17. This screw extends into a long nut 18 to which is secured a worm wheel 19 which meshes with a worm 20 on a longitudinal shaft 21. The nut 18 has a series of annular ribs $18^x$, which act as a thrust bearing during the bending process.

A shaft $21^a$ at the opposite end of the machine has a worm which meshes with a worm wheel $19^a$ carried by a nut $18^a$ into which extends an adjusting screw $17^a$ attached to the cross head $15^a$. On the shaft 21 is a clutch sleeve 23 and on the shaft $21^a$ is a clutch sleeve 24. 22 is a driven gear wheel loose on the shafts and provided with jaws with which one or both of the clutch sleeves can engage so that both nuts can be turned to raise or lower the roll 3, or a nut at either end can be turned when only one end of the roll is to be adjusted.

The bearing 13 has an eye 30 through which the hook or chain of a crane can be passed and when it is desired to remove a plate laterally from the rolls, an overhead crane is brought into position and its hook is passed through the eye 30 of the bearing 13. When the parts are taut, the pin 14 is removed leaving the bearing 13 and one end of the roll 3 suspended from the crane. The cross head 15 is then lowered so as to leave a clear space for the passage of the bent plate from between the rolls of the machine, after which the cross head is raised, the pin 14 is again inserted, the hook of the crane is detached, leaving the parts in the position in which they were before the plate was removed.

The rolls are then in position to bend another plate. The free end of the roll 3 can be raised any distance desired, as the bearing 10 at the opposite end is pivotally mounted on the pin 11.

I claim:

1. The combination in a plate bending machine, of a base; two lower rolls; means for driving said rolls; an upper roll; a bearing for one end of the upper roll; a bearing for the other end of the upper roll; a cross head detachably connected to one of said bearings; a screw means for raising and lowering the cross head; and means for suspending the upper roll while the said cross head is lowered.

2. The combination in a plate bending machine, of a base; two lower rolls mounted in bearings on the base; means for driving said lower rolls; an upper roll; a bearing for one end of the upper roll; a cross head to which the bearing is connected; a detachable bearing for the opposite end of said roll; a cross head; a removable pin securing the cross head to said last named bearing; a screw for raising and lowering each cross head; nuts mounted on the base through which the screws extend; and means for turning the nuts to raise and lower the screws.

3. The combination in a plate bending machine, of a base; two lower rolls mounted in bearings on the base; means for driving said lower rolls; an upper roll; a bearing for one end of the upper roll; a cross head to which the bearing is pivoted; a detachable bearing for the opposite end of said roll; a cross head; a removable pin securing the cross head to said last named bearing; a screw for raising and lowering each cross head; nuts mounted on the base through which the screws extend; means for turning the nuts to raise and lower the screws; and means for suspending the upper roll after the cross head has been detached so that a bent plate can be removed laterally from the machine.

4. The combination of a base; two rolls; bearings for the said rolls mounted on the base; means for driving said rolls; an upper roll; a pivoted bearing for one end of the upper roll; a cross head; a transverse pin connecting the removable bearing with the cross head; a screw pivoted to the cross head; a nut having annular ribs; a bearing in the base of the machine for the nut; and means for turning the nut, the ribs on the nut acting as a thrust bearing during the bending process.

THOMAS M. PLATT.